(12) United States Patent
Reynolds et al.

(10) Patent No.: US 6,884,481 B1
(45) Date of Patent: Apr. 26, 2005

(54) MOTION TRANSMITTING CABLE ASSEMBLIES HAVING ABRASION RESISTANT MULTI-WALL LINER

(76) Inventors: Kim A. Reynolds, 435 Lantern La., Berwyn, PA (US) 19111; Kevin P. Kray, 818 Camp Cir., Phoenixville, PA (US) 19460; Charles P. Marino, 430 Benson St., Philadelphia, PA (US) 19111

( * ) Notice: Subject to any disclaimer, the term of this patent is extended or adjusted under 35 U.S.C. 154(b) by 0 days.

(21) Appl. No.: 09/066,513

(22) Filed: Apr. 24, 1998

(51) Int. Cl.$^7$ ................................................. F16C 1/10
(52) U.S. Cl. .................. 428/35.7; 428/36.91; 428/421; 428/908.8
(58) Field of Search ............................ 428/35.7, 36.91, 428/421, 908.8, 36.9, 316.6, 422

(56) References Cited

U.S. PATENT DOCUMENTS

| | | | |
|---|---|---|---|
| 3,409,584 A | | 11/1968 | Buschman .................. 260/41 |
| 3,652,409 A | | 3/1972 | Mack et al. .................. 252/12 |
| 4,159,286 A | * | 6/1979 | Khattab et al. ...... 260/857 UN |
| 4,362,069 A | * | 12/1982 | Giatras et al. ............. 74/501 P |
| 4,451,616 A | | 5/1984 | Kawachi et al. ............ 525/178 |
| 4,580,790 A | * | 4/1986 | Doose ........................ 277/228 |
| 4,770,915 A | | 9/1988 | Nakagawa et al. ........... 428/74 |
| 4,987,274 A | * | 1/1991 | Miller et al. ............ 174/102 R |
| 5,006,594 A | | 4/1991 | Rees | 
| 5,161,427 A | * | 11/1992 | Fukuda et al. ............. 74/502.4 |
| 5,239,890 A | | 8/1993 | Sosnoski et al. |
| 5,243,876 A | | 9/1993 | Mang et al. |
| 5,636,551 A | * | 6/1997 | Davidson et al. .......... 74/502.5 |
| 5,653,266 A | * | 8/1997 | Reynolds et al. ............ 138/137 |
| 5,789,047 A | * | 8/1998 | Sasaki et al. ............. 428/36.91 |
| 5,922,425 A | * | 7/1999 | Gruel ...................... 428/36.91 |
| 6,040,384 A | * | 3/2000 | Reynolds et al. ........... 525/180 |
| 6,807,879 B1 | * | 10/2004 | Reynolds et al. .......... 74/502.5 |

FOREIGN PATENT DOCUMENTS

| | | | | |
|---|---|---|---|---|
| CA | 1254110 | * | 5/1989 | |
| DE | 29716149 | * | 1/1998 | |
| EP | 0 640188 B1 | * | 5/1988 | ............. F16C/1/20 |

OTHER PUBLICATIONS

US 5,045,600, 9/1991, Giatras et al. (withdrawn)

* cited by examiner

Primary Examiner—Sandra M. Nolan-Rayford
(74) Attorney, Agent, or Firm—Synnestvedt & Lechner LLP

(57) ABSTRACT

An abrasion-resistant multi-wall tubular article and a method of making same. The tubular article comprises an inner wall of polytetrafluoroethylene and an organic filler, an outer wall comprising polytetrafluoroethylene and an inorganic filler and a layer of polytetrafluoroethylene disposed therebetween. The article of the present invention has a high internal frictional efficiency over wide temperature and load conditions as well as an enhanced external crush and creep resistance and is particularly well adapted for use in motion transmitting cable assemblies and the like.

17 Claims, No Drawings

MOTION TRANSMITTING CABLE ASSEMBLIES HAVING ABRASION RESISTANT MULTI-WALL LINER

FIELD OF THE INVENTION

This invention relates to an abrasion-resistant multi-wall fluorocarbon polymer resin article, such as polytetrafluoroethylene ("PTFE") conduits, having high internal frictional efficiency over wide temperature and load conditions as well as enhanced external crush and creep resistance, and a method of making same. The article of the present invention is particularly well adapted for use in motion transmitting cable assemblies and the like.

BACKGROUND

Motion transmitting cable assemblies are typically used for the transmission of force and/or motion from one location to another in apparatus such as automobiles, aircraft, marine craft, motorcycles and bicycles. Such cable assemblies, typically comprising a cable for transmitting the appropriate force or motion and a conduit through which the cable is guided, are used in connection with the various critical components of the aforementioned apparatus, such as throttles, clutches and brakes, as well as a variety of accessories such as air conditioners, heaters, vents, side view mirrors, and the like. It will be understood that as used herein, motion transmitting cable assemblies shall mean extruded and molded tubular products such as push-pull, push-push, pull-pull and rotary cable assemblies and the like, as well as combinations and variations thereof.

Motion transmitting cable assemblies involve a variety of movements of the cable relative to the surrounding conduit including unidirectional, reciprocal, rotary, and combinations of these. Moreover, the movements of the cable relative to the surrounding conduit may range widely in rate, degree and constancy as well as the load under which such movements occur. As a result of these movements, the internal surface of the conduit surrounding the cable is subjected to repeated contact and abrasion by the cable. As used herein, abrasion will refer to the types of damage resulting to the internal surfaces of the articles of the present invention due to the relative movement of cables running therethrough.

It will be appreciated that reliable operation of motion transmitting cable assemblies over extended periods of use is both desirable and critical to the safety of vehicles employing such assemblies. Consequently, in order to achieve superior or even acceptable cable assembly life, conduits have heretofore been constructed with abrasion resistant liners, have employed lubricants and protective outer wrappings or casings, and have utilized combinations of these measures.

Fluorocarbon polymers, such as PTFE resins, are well known in the art and have heretofore been utilized in extruded and molded products such as motion transmitting cable assemblies and the like. In their pure form, PTFE resins exhibit excellent frictional efficiencies. In such form, however, PTFE resins generally exhibit unacceptably low abrasion and creep resistance. As a result, attempts have been made to improve the abrasion and creep resistance of PTFE resins by the addition of organic and inorganic materials as fillers.

It is well known in the art to enhance the abrasion resistance of polymeric products, particularly PTFE extruded products such as conduits, by the inclusion of inert, inorganic fillers such as glass fibers, carbon, asbestos fibers, mica, metals and metal oxides. See, for example, U.S. Pat. No. 3,409,584—Buschman, et al. While a measure of improvement in abrasion resistance has thus been achieved, applicant has recognized that PTFE composites comprising inorganic fillers have continued to display several disadvantages.

The inclusion of inorganic fillers in PTFE conduits for motion transmitting cable assemblies generally lowers the frictional efficiency of such conduits. Further, such inorganically filled articles tend to exhibit rapid deterioration in frictional efficiency after relatively short periods of use. Moreover, the use of lubricants to counteract the loss of frictional efficiency in such conduits is not generally recommended because the inorganic fillers have been found to separate from the composite matrix and form an abrasive slurry with the lubricant. This abrasive slurry not only decreases frictional efficiency of the conduit, but also can cause rapid and catastrophic failure thereof. As a practical result, therefore, it has not been heretofore possible to use inorganically filled PTFE composites in motion transmitting cable assemblies and achieve sustainable high frictional efficiencies.

Fluorocarbon polymers have also been modified to include organic fillers. See, for example, U.S. Pat. No. 3,652,409—Mack et al., and U.S. Pat. No. 4,362,069—Giatras et al. Generally, such organic fillers suitable for use in fluorocarbon polymer conduits are expensive and render the resultant article economically disadvantageous. Further, where organically filled fluorocarbon polymer conduits have been used acceptably they have required relatively expensive and cumbersome outer casings, such as lay wires or steel ribbon wrapping helically wound thereabout, in order to protect the abrasion-resistant material incorporated therein.

Due to the limitations found in the prior art, abrasion resistance in motion transmitting cables has heretofore been limited. Applicant has surprisingly and unexpectedly found that a multi-wall conduit comprising at least an inner wall and an outer wall wherein the inner wall comprises PTFE and the outer wall comprises a composition of PTFE and an inorganic filler yields an article which exhibits superior abrasion resistance. In certain preferred embodiments, the inner wall further comprises an organic filler to further enhance abrasion resistance. The articles of the present invention also provide the additional benefits of superior crush and creep resistance as well. The articles of the present invention are particularly well adapted for use in motion transmitting cable assemblies and the like.

Accordingly, it is an object of the present invention to provide an abrasion resistant multi-wall conduit.

It is another object of the present invention to provide an abrasion resistant multi-wall conduit adapted for use in motion transmitting cable assemblies and the like.

It is yet another object of the present invention to provide an abrasion resistant multi-wall conduit adapted for use in motion transmitting cable assemblies and the like having superior crush and creep resistance.

Still other objects of the invention will be apparent to those of ordinary skill in the art and upon consideration of the following description of the invention.

DESCRIPTION

The present invention relates to abrasion resistant, multi-wall fluorocarbon polymer resin articles having high frictional efficiency over wide temperature and load conditions as well as enhanced crush and creep resistance. The articles of the present invention comprise at least two walls arranged in a coaxial configuration wherein the inner wall comprises a fluorocarbon polymer resin, preferably PTFE, and the outer wall comprises a fluorocarbon polymer resin, preferably PTFE, and an inorganic filler. In certain preferred embodiments, the inner wall component will further comprise an organic filler. The articles of the present invention may further comprise an additional wall, also arranged coaxially and disposed between the inner and the outer walls, comprising a fluorocarbon polymer resin, preferably PTFE. The multi-wall article as disclosed more fully below is well adapted for use as a conduit in motion transmitting assemblies and the like.

A distinguishing feature of the present invention over the prior art is the employment of multi-wall construction. This multi-wall construction permits realization of a number of advantages including the combination of enhanced abrasion resistance with enhanced crush and creep resistance. Moreover, this combination of properties is realized in the articles of the present invention while avoiding many of the disadvantages found in the prior art as set forth above.

More particularly, by providing a separating layer between the inorganically filled composite comprising the outer wall of a motion transmitting cable assembly conduit and the cable running therethrough, the loss of frictional efficiency as well as the potential for forming an abrasive slurry with the-lubricating medium leading to rapid or catastrophic deterioration of the conduit is avoided without the loss of abrasion resistance. By the same token, by surrounding the inner wall with a continuous and relatively hard protective layer, i.e., the inorganically filled outer wall, the abrasion resistance of the inner wall of the resulting article is enhanced and permits for certain applications the utilization of PTFE without the need for abrasion-resistance enhancing fillers as the material comprising the inner wall having direct contact with the cable running therethrough. Further, by employing an inorganically filled outer wall, the additional benefits of crush and creep resistance are also realized and the use of costly organic filler material can either be significantly reduced or, in certain embodiments, eliminated entirely.

It is important to the present invention that all of the wall components are formed substantially simultaneously. More specifically, independent of the particular process employed in the formation of the multi-wall conduit, it is important that an intimate mechanical bond between adjacent walls of the conduit be established. This bond is most advantageously created through the mechanical interlocking of the particles of the composites comprising the interface between adjacent walls which occurs as the walls are co-extruded or otherwise formed.

In certain preferred embodiments, a paste extrusion process is employed. When such a process is applied to the present invention, it preferably comprises the steps of 1) separately premixing the wall component compositions with predetermined quantities of extrusion aid material sufficient to allow compatible degrees of flowability; 2) arranging the two compositions in a preform so that the composition forming the outer wall is disposed in a coaxial arrangement about the composition forming the inner wall; 3) extruding the preform under pressure; 4) heating the extruded article to a temperature sufficient to volatilize off substantially all of the extrusion aid material; and 5) sintering the extruded article in a second oven to a temperature above the melt temperature of the compositions.

Polymers suitable for use according to the present invention include fluorocarbon polymers which are capable of being combined with organic and inorganic fillers and formable into multi-wall articles which exhibit the combined properties of enhanced abrasion, crush and creep resistance. A particularly preferred fluorocarbon polymer comprises PTFE.

PTFE polymers useful in the practice of the present invention may comprise PTFE homopolymer, although it is contemplated that the PTFE polymer will preferably comprise a copolymer of tetrafluoroethylene monomer ("TFE") with other halocarbon monomers such as, for example, chlorotrifluoroethylene ("CTFE"), hexafluoropropylene ("HFP") or perfluoropropylvinyl ether ("PPVE"). Preferably, the PTFE polymer will comprise a copolymer of TFE and CTFE. Accordingly, it should be understood that use herein of the term fluorocarbon shall include both fluorocarbon homopolymers as well as copolymers of fluorocarbons and other halocarbons.

The PTFE polymers suitable for use in the articles of the present invention include conventional PTFE polymers obtained by conventional means, for example, by the polymerization of TFE under pressure using free radical catalysts such as peroxides or persulfates. PTFE produced by other means is also considered suitable for use provided that the PTFE resin produced by such means is capable of being combined with fillers to form articles which display enhanced abrasion, crush and creep resistance.

While the use of granular PTFE, or a blend of granular and a coagulated dispersion resin PTFE is considered to be within the scope of the present invention, it is contemplated that the use of a coagulated dispersion resin PTFE is preferred as such resins are more amenable to extrusion. The preference for a coagulated dispersion resin PTFE in such embodiments is also driven by the processing requirements of paste extrusion. As is known to the art, paste extrusion involves a packing step in which material is arranged in a mold often referred to as a preform. In accordance with the known packing characteristics of PTFE, the use of a coagulated dispersion resin achieves more readily a uniform and complete distribution of filler material within the mold thereby minimizing the creation of voids. The use of a coagulated dispersion resin in paste extrusion processes also yields a superior extruded product in which the PTFE particles comprising the mold are transformed into a tightly knit matrix of elongated strand-like particles.

Techniques for the production of coagulated dispersion PTFE resins are well known, and the use of PTFE resins produced by any of these techniques is well within the scope of this invention. For example, coagulated dispersion PTFE resins may be produced by coagulating colloidal PTFE particles as disclosed more fully in U.S. Pat. No. 4,451,616, which is incorporated herein by reference.

The Inner Wall Component

In certain preferred embodiments, the articles of the present invention will comprise a conduit having two relatively discreet, coaxially arranged walls. As used hereinafter, these two coaxially arranged walls will be referred to as the inner wall and the outer wall, respectively. In certain other preferred embodiments, the articles of the present invention will further comprise a third, relatively discreet, coaxially arranged wall disposed between the inner wall and the outer wall.

In all embodiments which comprise at least an inner wall and an outer wall, the material comprising the inner wall component preferably comprises a fluorocarbon polymer, even more preferably PTFE, and even more preferably coagulated dispersion resin PTFE. While PTFE has a relatively high frictional efficiency, pure PTFE has heretofore been impractical as a material for use in direct contact with the repetitive movements of cables in motion transmitting cable assemblies due to its limited abrasion resistance as described above. In certain embodiments of the present invention, pure PTFE is a preferred material for the inner wall component due to the presence of, and role played by, the inorganically filled outer wall component. Due to the multi-wall configuration, the outer wall component of the articles of the present invention provides a firm backing to the inner wall component and permits the inner wall to be composed of pure PTFE without an unacceptable loss in abrasion resistance.

In certain embodiments, the inner wall component further comprises an organic filler. The inclusion of such a filler material in the inner wall component further enhances abrasion and creep resistance. In such embodiments, the organic fillers suitable for use in the articles of the present invention may be any of a wide variety of high temperature organic compounds including aromatic polyesters, thermoplastic or thermosetting polyamide, polyimide, and polyamide imide resins, polyetherimides, polyether ketones, polyether ether ketones, polysufones, polyether sulfones, polyphenylene sulfones, polyphenylene sulfides, polysulfide imides, and the like.

The amount of organic filler added will vary with, among other things, the filler material used and the desired performance characteristics of the resultant conduit. The organic filler should nonetheless be present in sufficient concentrations to attain a resulting composite capable of relatively high frictional efficiency over extended periods of use and under various load conditions. Generally, the organic fillers are preferably present in amounts from about 2 to about 40 percent by weight of the composite, and even more preferably from about 5 to about 25 percent by weight.

The Outer Wall Component

The material comprising the outer wall component preferably comprises a fluorocarbon polymer, even more preferably PTFE, and even more preferably coagulated dispersion resin PTFE. Such polymers are preferred for use in the outer wall component of the present invention as they are capable of being filled with any of a wide variety of inorganic filler materials to form a relatively hard outer wall of a multi-wall article having enhanced tensile strength and crush resistance.

The inorganic filler suitable for use in the present invention may comprise a wide variety of inorganic materials including carbon fibers, carbon powder, graphite, coke flour, amorphous glass, glass fibers, glass spheres, milled glass, bronze, iron powder, iron oxide, silicon dioxide, boric oxide, zirconium oxide, and molybdenum disulfide and the like.

The inorganic filler is incorporated into the fluoropolymer resin in amounts sufficient to impart the desired improvement in physical properties. For most contemplated inorganic fillers, the filler component of the outer wall composition will be present in concentrations from about 5 to about 90 percent by weight of the composite, and more preferably from about 10 to about 40 percent by weight. Moreover, due to the provision of an inner wall as described above, lubricants can be used advantageously within the resulting conduit articles to further enhance the frictional efficiency thereof without the risk of creating an abrasive slurry with the inorganic filler material as is typically found in single walled, inorganically filled fluorocarbon polymer articles of the prior art.

The Multi-Wall Article

The combination of an abrasion resistant inner wall comprising a fluorocarbon polymer resin with a crush resistant, relatively hard outer wall comprising a fluorocarbon polymer resin and an inorganic filler provides the multi-wall article of the present invention. In certain preferred embodiments, the multi-wall article further comprises a third wall comprising a fluorocarbon polymer resin disposed between the inner wall and the outer wall. Insofar as organic fillers suitable for use in the present invention are, as a general matter, significantly more expensive per unit weight than similarly suitable inorganic fillers, significant cost savings can be realized in the construction of articles which do not contain organic fillers or which minimize the amounts required by having the outer wall component comprise the major compositional percentage of the article so formed.

In certain embodiments, it will be desirable to maximize the percentage of the thickness of the dual wall article comprising the outer wall composite in order to produce a firmer backing for the inner wall as well as to provide greater crush resistance. In applications in which significant internal abrasive forces are imparted, such as high load applications, the inner wall component will preferably comprise a combination of fluorocarbon polymer resin and an organic filler, and may also comprise up to about 50% of the overall thickness of the multi wall-article in order to ensure adequate abrasion resistance. Thus, while the relative thicknesses of the inner and the outer walls will be determined by, and will vary in accordance with, among other things, the applications for which the articles are intended, it is contemplated that the thickness of the inner wall will preferably comprise from about 5 to about 50%, and even more preferably from about 10 to about 25%, of the total thickness of the articles so formed. Correspondingly, the thickness of the outer wall will preferably comprise from about 50 to about 95%, and even more preferably from about 75 to about 90%, of the total thickness thereof.

EXAMPLE 1

55 pounds of neat coagulated dispersion resin PTFE, 13.75 pounds of polyphenylene sulfide powder, and 14.08 pounds of an isoparaffinic extrusion aid solvent sold under the trade name ISOPAR G by Exxon USA is charged to a Patterson-Kelley Liquids-Solids blender and mixed for ten minutes. The resultant mixture is designated Composition A. Separately from Composition A, 55 pounds of neat coagulated dispersion resin PTFE, 9.71 pounds of solid glass spheres and 13.25 pounds of ISOPAR G is charged to a Patterson-Kelley Liquids-Solids blender and mixed for ten minutes. The resultant mixture is designated Composition B.

Composition A is placed into the inner compartment of a two-part mold configured in a generally cylindrical shape having concentrically arranged inner and outer cylindrical portions. Composition B is placed in the outer compartment of the mold so that Composition B is disposed about Composition A. The walls of the inner compartment are spaced to define a distance of about 35 mm., and the walls of the outer compartment are spaced to define a distance of about 63 mm. The inner compartment of the mold is then removed placing the Composition B in direct contact with and completely surrounding Composition A. The combination of Composition A and Composition B are longitudinally compressed simultaneously at about 300 psi to form a preform.

An extrusion cylinder of a Jennings ram extruder having a 108 inch stroke and a 3.5 inch diameter is loaded with a preform which is then paste extruded at room temperature with the extrusion die heated to 200° F. The extruded article is then heated in a first oven to 380° F. for one minute in order to volatilize off substantially all of the extrusion aid material. The article is then heated in a second oven to 700° F. for one minute in order to sinter the extruded article and complete the formation of the bonds within and between the inner and outer walls thereof. The sintered, dual-wall article thus formed comprises an inner wall of 20% of the overall thickness of the conduit and an outer wall of 80% of the overall thickness of the conduit.

EXAMPLE 2

A high-load ambient S-test was performed on the sintered dual wall article produced in accordance with Example 1 to demonstrate the improved abrasion resistance thereof. This test was conducted using a tubular conduit having a 7×7 stranded stainless steel wire guided therethrough routed over an "S" shaped fixture wherein the curvilinear portions define inner radii of 4 inches and subtends angles of 120 degrees in accordance with General Motors standard CMP-TF004. The wire is then actuated by a motor to cause a repetitive reciprocal movement of 1.5 inches relative to the tubular conduit at a frequency of 60 cycles per minute. Abrasion resistance was then measured after the completion of 500,000 S-test cycles by weighing the conduit, after cleaning with isopropyl alcohol and allowing to dry, and comparing measured weight with the weight of the conduit prior to testing. The conduit was found to have a weight gain of 10 milligrams after testing. In addition, the conduit was also found to have a frictional efficiency of 90% after completion of 500,000 test cycles as measured in accordance with General Motors standard CMP-TF004.

What is claimed is:

1. A motion transmitting cable assembly comprising an abrasion resistant tubular article and a motion transmitting core moveably disposed within the tubular article, said tubular article comprising an inner wall component and an outer wall component, wherein said inner wall component comprises from about 60 to about 98 wt. % polytetrafluoroethylene and from about 2 to about 40 wt. % organic filler wherein said outer wall component comprises polytetrafluoroethylene and an inorganic filler, said outer wall component is disposed around and bonded to said inner wall component by a layer of polytetrafluoroethylene disposed therebetween.

2. The assembly of claim 1, wherein the inner wall comprises from about 75 to about 95 wt % polytetrafluoroethylene and from about 2 to about 25 wt % organic filler.

3. The assembly of claim 1 wherein the inner wall comprises from about 75 to about 95 wt. % polytetrafluoroethylene and from about 5 to about 25 wt. % organic filler.

4. The assembly of claim 1 wherein the inorganic filler is selected from the group consisting of carbon fibers, carbon powder, graphite, coke flour, amorphous glass, glass fibers, glass spheres, milled glass, bronze, iron powder, iron oxide, silicon dioxide, boric oxide, zirconium oxide, and molybdenum disulfide and combinations of two ore more of these.

5. The assembly of claim 1 wherein the organic filler is selected from the group consisting of aromatic polyesters, thermoplastic or thermosetting polyamide, polyimide and polyamide imide resins, polyetherimides, polyether ketones, polyether ether ketones, polysufones, polyether sulfones, polyphenylene sulfones, polyphenylene sulfides, polysulfide imides and combinations of two or more of these.

6. The assembly of claim 1 wherein the inner wall comprises from about 5 to about 50% of the total thickness of the tubular article.

7. The assembly of claim 1 wherein the inner wall comprises from about 10 to about 25% of the total thickness of the tubular article.

8. The assembly of claim 1 wherein the inner wall comprises from about 75 to about 90 wt. % polytetrafluoroethylene and from about 5 to about 25 wt. % organic filler and wherein the outer wall comprises from about 60 to about 90 wt. % polytetrafluoroethylene and from about 10 to about 40 wt. % inorganic filler.

9. The assembly of claim 8 wherein the inorganic filler is selected from the group consisting of carbon fibers, carbon powder, graphite, coke flour, amorphous glass, glass fibers, glass spheres, milled glass, bronze, iron powder, iron oxide, silicon dioxide, boric oxide, zirconium oxide, molybdenum disulfide and combinations of two or more of these.

10. The assembly of claim 8 wherein the organic filler is selected from the group consisting of aromatic polyesters, thermoplastic or thermosetting polyamideimide resins, polyetherimides, polyether ketones, polyether ether ketones, polysulfones, polyphenylene sulfones, polyphenylene sulfides, polysulfide amides and combinations of two or more of these.

11. The assembly of claim 1 wherein the inner wall comprises from about 5 to about 50% of the total thickness of the tubular article.

12. The assembly of claim 1 wherein the inner wall comprises from about 10 to about 25% of the total thickness of the tubular article.

13. The assembly of claim 1 wherein the layer of polytetrafluoroethylene comprises from about 25 to about 85% of the total thickness of the tubular article.

14. The motion transmitting cable assembly of claim 1, wherein said core comprises a stranded stainless steel wire.

15. The assembly of claim 1 wherein said inner wall component and said outer wall component are co-extruded.

16. The assembly of claim 1 wherein said inner wall component, said outer wall component and said layer of polytetrafluoroethylene are co-extruded.

17. The assembly of claim 1 wherein said inner wall component is substantially free of inorganic filler.

* * * * *